US008458794B1

(12) United States Patent
Sallam (10) Patent No.: US 8,458,794 B1
(45) Date of Patent: Jun. 4, 2013

(54) SYSTEM, METHOD, AND COMPUTER PROGRAM PRODUCT FOR DETERMINING WHETHER A HOOK IS ASSOCIATED WITH POTENTIALLY UNWANTED ACTIVITY

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 847 days.

(21) Appl. No.: 11/851,308

(22) Filed: Sep. 6, 2007

(51) Int. Cl.
*G06F 11/00* (2006.01)

(52) U.S. Cl.
USPC .................. 726/23; 726/22; 726/24; 726/25

(58) Field of Classification Search
USPC .......................................... 726/23, 24, 22, 25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,607,173 B1 * | 10/2009 | Szor et al. | 726/25 |
| 7,647,636 B2 * | 1/2010 | Polyakov et al. | 726/24 |
| 2003/0188189 A1 | 10/2003 | Desai et al. | 713/201 |
| 2005/0204205 A1 | 9/2005 | Ring et al. | 714/47 |
| 2005/0257265 A1 * | 11/2005 | Cook et al. | 726/23 |
| 2006/0294592 A1 | 12/2006 | Polyakov et al. | 726/24 |
| 2007/0055711 A1 | 3/2007 | Polyakov et al. | 707/203 |
| 2007/0079178 A1 | 4/2007 | Gassoway | 714/38 |
| 2008/0104130 A1 | 5/2008 | Sallam | 707/200 |
| 2008/0109906 A1 | 5/2008 | Sallam | 726/24 |
| 2008/0127344 A1 | 5/2008 | Sallam | 726/23 |
| 2009/0049550 A1 * | 2/2009 | Shevchenko | 726/23 |

OTHER PUBLICATIONS

Butler et al., "VICE—Catch the hookers!" Proceedings of Black Hat USA 2004 Briefings & Training, Jul. 24-29, 2004, Las Vegas, NV.
Butler et al., "Windows rootkits of 2005, part three," SecurityFocus, Jan. 5, 2006.
Cogswell et al., "RootkitRevealer v1.71," Microsoft TechNet, Microsoft Corporation, Nov. 1, 2006.
Rutkowska, "System Virginity Verifier, Defining the Roadmap for Malware Detection on Windows System," Proceedings of *Hack in the Box* Security Conference, Sep. 28-29, 2005, Kuala Lumpur, Malaysia.
Messmer, "Experts divided over rootkit detection and removal," NetworkWorld.com, Aug. 28, 2006.
Rutkowski, "Advanced Windows 2000 Rootkit Detection (Execution Path Analysis)," Jul. 2003.
Kruegel et al., "Detecting Kernel-Level Rootkits Through Binary Analysis," Proceedings of the 20th Annual Computer Security Applications Conference, Dec. 8, 2004, Tucson, AZ.
"McAfee Avert Stinger," copyright 2003-2007, McAfee, Inc.
"McAfee Rootkit Detective 1.0," copyright 2003-2007, McAfee, Inc.

* cited by examiner

*Primary Examiner* — Teshome Hailu
(74) *Attorney, Agent, or Firm* — Patent Capital Group (57) ABSTRACT

A system, method, and computer program product are provided for determining whether a hook is associated with potentially unwanted activity. In use, a hook is identified in a data section or a code section. Additionally, a first enumeration of objects associated with the data section or the code section is performed, and a second enumeration of objects associated with the data section or the code section is performed. Further, results of the first enumeration and results of the second enumeration are compared for determining whether the hook is associated with potentially unwanted activity.

16 Claims, 6 Drawing Sheets

SYSTEM, METHOD, AND COMPUTER PROGRAM PRODUCT FOR DETERMINING WHETHER A HOOK IS ASSOCIATED WITH POTENTIALLY UNWANTED ACTIVITY

FIELD OF THE INVENTION

The present invention relates to detecting unwanted activity, and more particularly to detecting unwanted activity associated with hooks.

BACKGROUND

Security systems have traditionally been developed for detecting unwanted activity. For example, unwanted activity has oftentimes been a result of unwanted processes (e.g. rootkits, etc.). However, such security systems have customarily exhibited various limitations in detecting unwanted activity associated with hooks. For example, in general, it has been difficult to distinguish between hooks associated with wanted activity (e.g. legitimate applications, etc.) and hooks associated with unwanted activity. Accordingly, security systems utilized for detecting unwanted activity associated with hooks often result in numerous false positive detections of unwanted activity.

There is thus a need for addressing these and/or other issues associated with the prior art.

SUMMARY

A system, method, and computer program product are provided for determining whether a hook is associated with potentially unwanted activity. In use, a hook is identified in a data section or a code section. Additionally, a first enumeration of objects associated with the data section or the code section is performed, and a second enumeration of objects associated with the data section or the code section is performed. Further, results of the first enumeration and results of the second enumeration are compared for determining whether the hook is associated with potentially unwanted activity.

DETAILED DESCRIPTION

Figure 1:
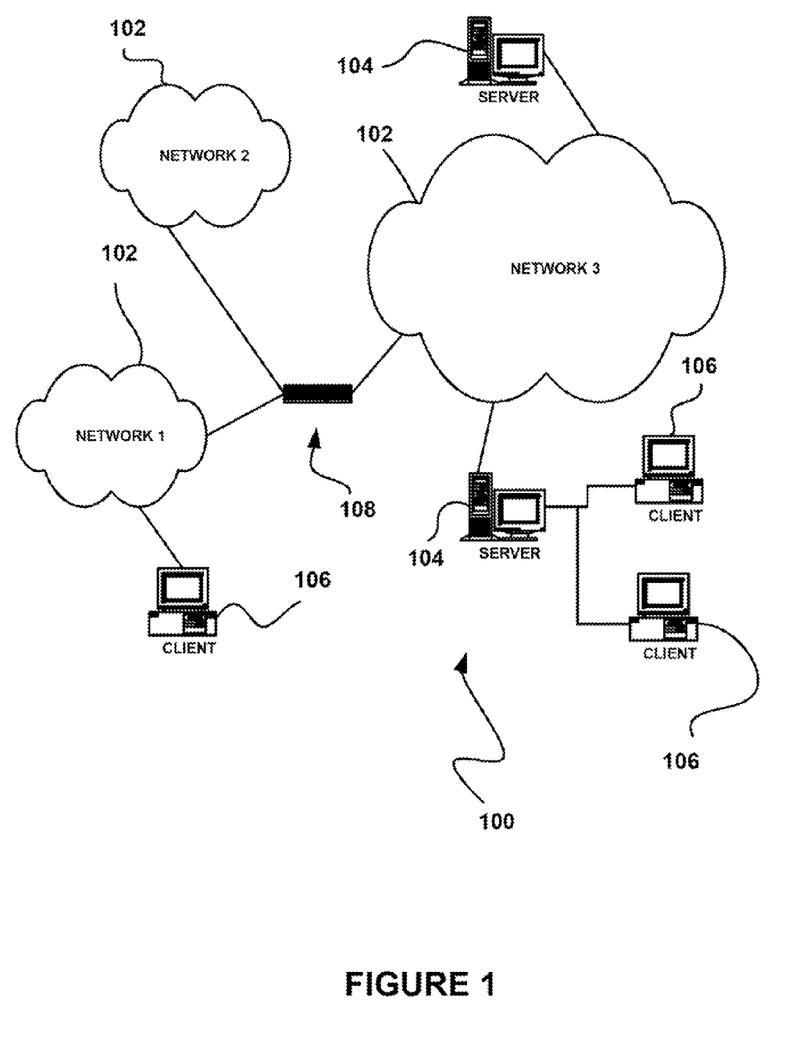
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
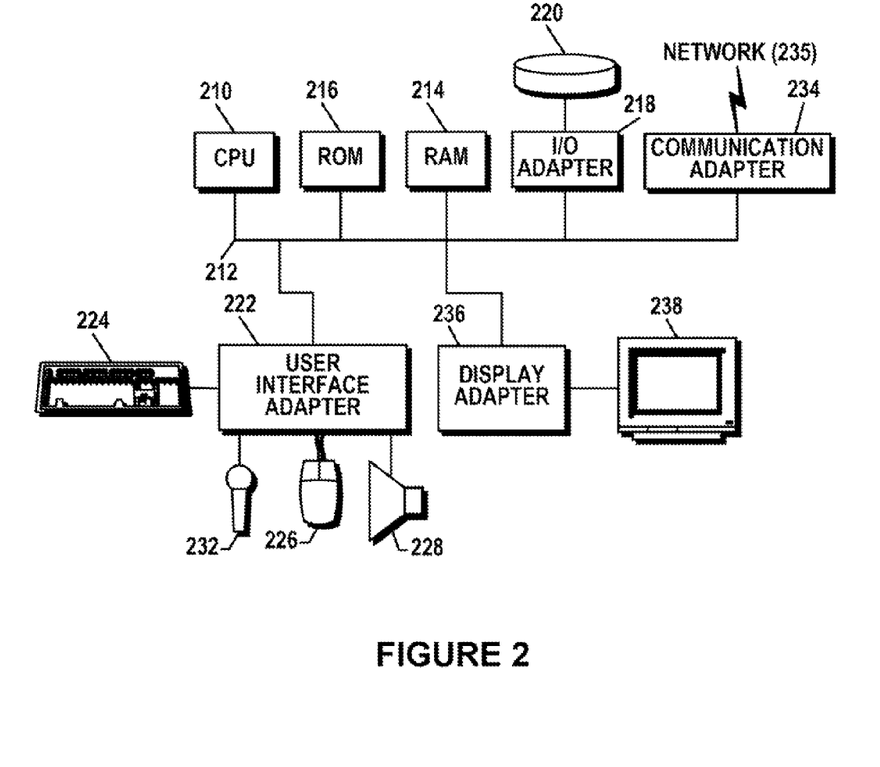
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
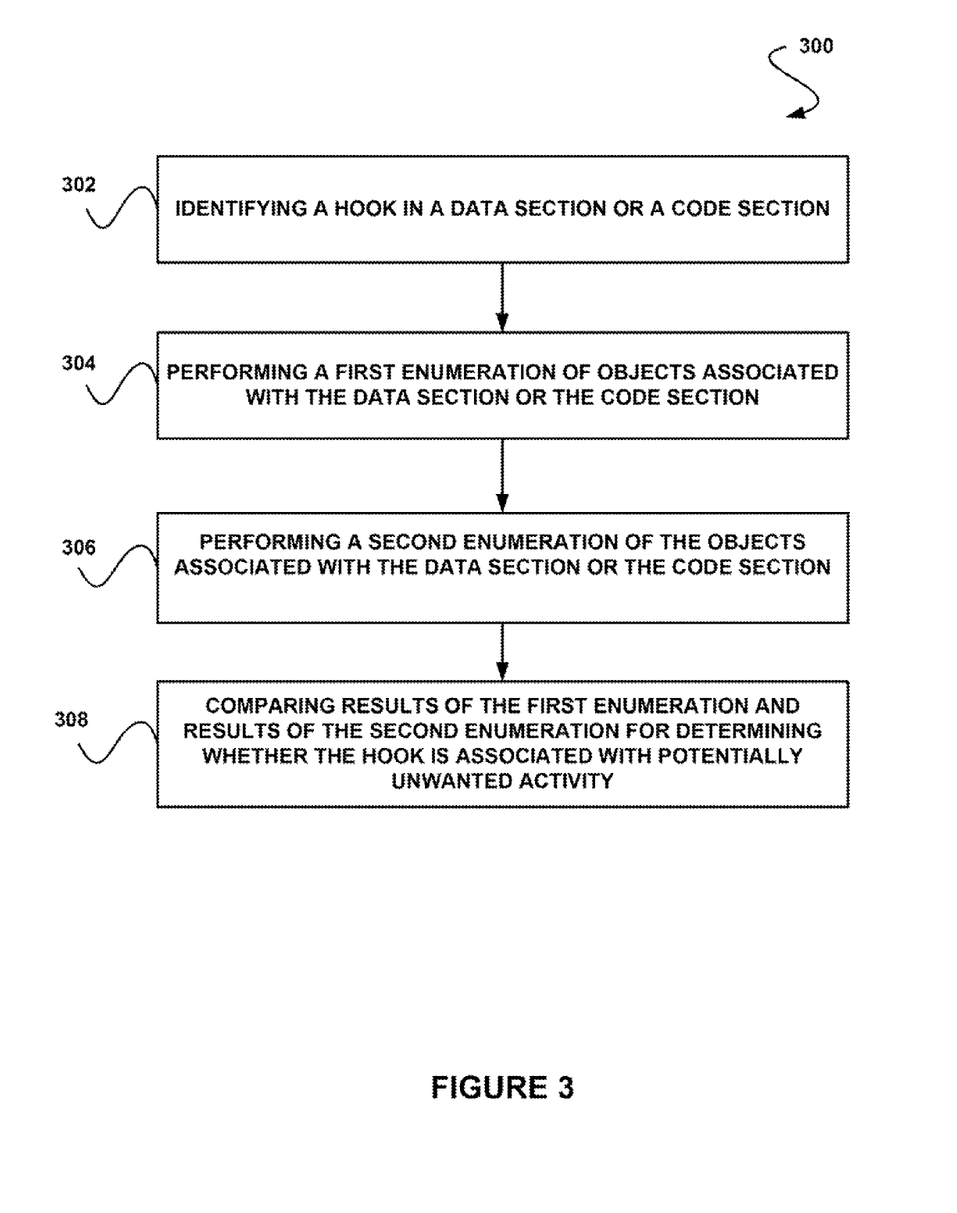
FIG. 3 shows a method for determining whether a hook is associated with potentially unwanted activity, in accordance with one embodiment.

FIG. 3 shows a method 300 for determining whether a hook is associated with potentially unwanted activity, in accordance with one embodiment. As an option, the method 300 may be carried out in the context of the architecture and environment of FIGS. 1 and/or 2. Of course, however, the method 300 may be carried out in any desired environment.

As shown in operation 302, a hook is identified in a data section or a code section. The data section may include any section of memory in which data is stored. Such data may optionally include non-functional data (e.g. data read by applications, etc.). For example, the data section may be included in (e.g. be a portion of, etc.) application memory (e.g. user mode application memory, etc.). As another example, the data section may be included in a kernel of an operating system.

Additionally, the code section may include any section of memory in which code is stored. Such code may include functions, applications, etc. In one embodiment, the code section may be included in the kernel of the operating system.

Further, in the context of the present embodiment, the hook may include any modification to the data section or the code section. For example, the hook may include a modification which changes an execution path associated with the data section or the code section. Optionally, the hook may include a memory hook.

In one embodiment, the hook in the data section may include a modification to a function pointer in the data section. For example, the hook in the data section may replace the function pointer in memory. Optionally, the function pointer may be associated with an interrupt descriptor table (IDT) entry, a device driver dispatch routine [e.g. an input/output (I/O) packet (IRP) dispatch function, etc.], a system service dispatch table (SSDT) entry, an import address table (IAT) entry, an export address table (EAT) entry, etc.

In another embodiment, the hook in the code section may include a modification to a function (e.g. instruction, etc.) in the code section. For example, the hook in the code section may include a function inserted into the code section. Such function may include a jump (IMP) function, a CALL function, a return (RET) function and/or any other function which may be utilized for transferring control within the code section.

Still yet, the hook may be identified in any desired manner. In one embodiment, the hook may be identified by scanning the data section and/or the code section. Such scanning may be performed by a security system (e.g. anti-virus system, etc.), for example.

In another embodiment, the hook may be identified by identifying a modification to the data section or the code section. Such modification may optionally be identified by comparing the data section to a previous version of the data section or the code section to a previous version of the code section. The previous version of the data section and/or the code section may optionally include an original version (e.g. when the data section or the code section was created, etc.).

Furthermore, the previous version of the data section may be identified by parsing a section of a binary file (e.g. IAT, EAT, etc.) associated with the data section, as an option. As another option, the pervious version of the data section may be identified by locating known function pointers located outside of a main module associated with the data section. For example, such function pointers may include an IRP dispatch routine of a device driver. Still yet, the previous version of the code section may be identified in a stored file image of the code section. For example, the file image may be stored on a disk drive.

As also shown, a first enumeration of objects associated with the data section or the code section is performed. Note operation 304. In the context of the present description, the first enumeration may include an identification of any objects associated with the data section or the code section. For example, if the hook is identified in the data section, the first enumeration may be performed for identifying objects associated with the data section. As another example, if the hook is identified in the code section, the first enumeration may be performed for identifying objects associated with the code section.

In various embodiments, the objects may include a file, an application, a portion of memory, a registry, a pointer (e.g. function pointer), etc. Of course, however, the objects may include any data, code, etc. capable of being associated with the data section or the code section. To this end, the first enumeration may optionally include a function, which when executed, enumerates objects associated with the data section or the code section.

In one embodiment, the first enumeration may be affected by the hook. Thus, the first enumeration may be identified based on any enumerations affected by the hook. As an option, the first enumeration may be capable of enumerating an object associated with the hook. Just by way of example, if the hook modified a function pointer (e.g. FindNextFileW pointer) in the data section, the first enumeration may call the function (e.g. FindFirstFileW) associated with the function pointer. As another example, if the hook inserted a JMP function into another function (e.g. ZwQuerySystemInformation) within the code section, the first enumeration may call the other function (e.g. ZwQuerySystemInformation).

In another embodiment, the first enumeration may be performed with the hook in the data section or the code section. For example, if the hook is identified in the data section, the first enumeration may be performed with the hook in the data section. As another example, if the hook is identified in the code section, the first enumeration may be performed with the hook in the code section. In this way, the first enumeration may be performed with respect to a current state of the data section or the code section (e.g. such that the hook in included in such data section or code section).

Moreover, a second enumeration of objects associated with the data section or the code section is performed, as shown in operation 306. With respect to the present description, the second enumeration may include an identification of any objects associated with the data section or the code section. For example, if the hook is identified in the data section, the first enumeration may be performed for identifying objects associated with the data section, and so forth.

In one embodiment, the second enumeration may be performed after the first enumeration. In another embodiment, the second enumeration may be performed with the hook removed from the data section or the code section in which such hook was identified. In yet another embodiment, the second enumeration may be the same as the first enumeration. For example, if the first enumeration called a function associated with a function pointer, the second enumeration may call such function. Accordingly, the second enumeration may identify any objects associated with the data section or the code section in which the hook has been removed, such that any object affected by the hook (e.g. hidden by the hook, etc.) may be identified utilizing the second enumeration.

Additionally, as shown in operation 306, results of the first enumeration and results of the second enumeration are compared for determining whether the hook is associated with potentially unwanted activity. In the context of the present description, the potentially unwanted activity may include any activity that is at least potentially unwanted. For example, the potentially unwanted activity may include a rootkit.

In one embodiment, any objects returned by the first enumeration may be compared with any objects returned by the second enumeration. Thus, in an embodiment where the first enumeration is performed with the hook in the data section or the code section and the second enumeration is performed with the hook removed for the data section or the code section, it may be determined whether the hook affects objects associated with the data section or the code section. Just by way of example, it may be determined whether the hook hides objects associated with the data section or the code section.

Optionally, the potentially unwanted activity may be identified if the results of the first enumeration do not match the results of the second enumeration. For example, the potentially unwanted activity may be identified if the results of the first enumeration include different objects, less objects, etc. than the results of the second enumeration. In this way, the potentially unwanted activity associated with the hook may include changing objects, hiding objects, etc. with respect to the data section or the code section.

Accordingly, false positive detections of potentially unwanted activity may be prevented by comparing results of the first enumeration with the results of the second enumeration for determining whether the hook is associated with potentially unwanted activity. Further, basing the determination of whether the hook is associated with potentially unwanted activity on the results of the first enumeration and the results of the second enumeration may avoid requiring prior knowledge associated with the potentially unwanted activity (e.g. such as a signature, etc.).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
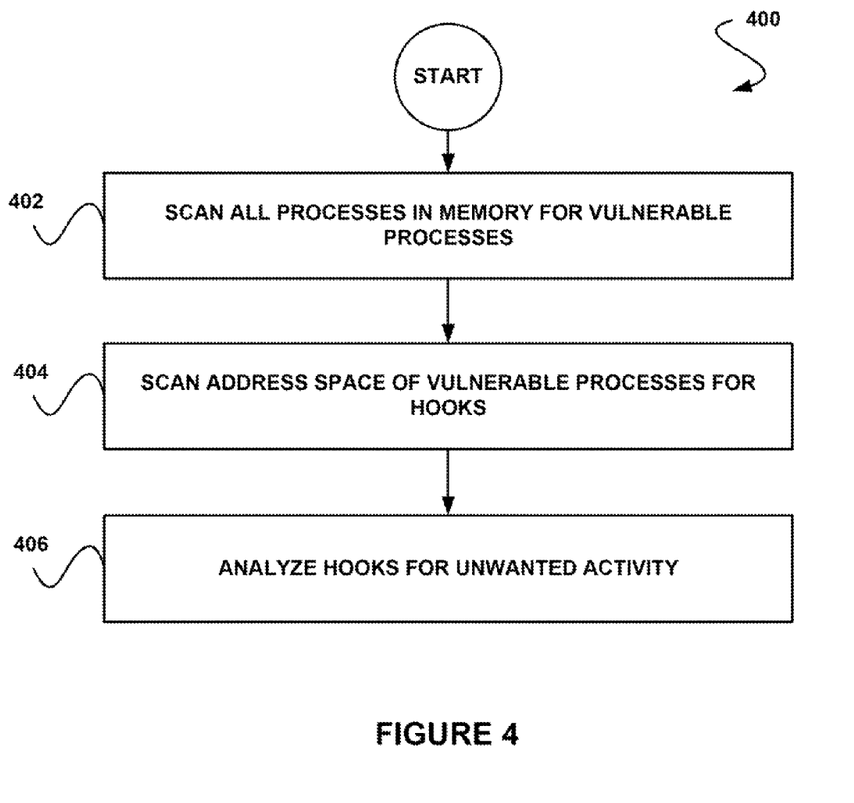
FIG. 4 shows method for analyzing hooks for unwanted activity, in accordance with another embodiment.

FIG. 4 shows a method 400 for analyzing hooks for unwanted activity, in accordance with another embodiment. As an option, the method 400 may be carried out in the context of the architecture and environment of FIGS. 1-3. For example, the method 300 of FIG. 3 may be carried out in the context of operation 406 of FIG. 4. Of course, however, the method 400 may be carried out in any desired environment. It should also be noted that the aforementioned definitions may apply during the present description.

As shown in operation 402, all processes in memory are scanned for vulnerable processes. In the context of the present embodiment, the processes may include any code, etc. in the course of being executed. For example, each process may be associated with an execution thread. Further, each process may include a process of an application.

In one embodiment, the vulnerable processes may include predetermined processes determined to be vulnerable to potentially unwanted activity. In another embodiment, the vulnerable processes may include processes excluded from a list of predetermined processes determined to be vulnerable to potentially unwanted activity. To this end, the processes in memory may be scanned for vulnerable processes by comparing such processes to the vulnerable processes.

in yet another embodiment, the processes may be scanned for vulnerable processes by determining whether any system objects are associated with the processes. Optionally, the system objects may be identified by calling high level functions inside a process address space. Further, a low level enumeration may be called inside a kernel of an operating system in which the processes are executing. Thus, the vulnerable processes may be identified by identifying processes associated with system objects.

Additionally, as shown in operation 404, address space of the vulnerable processes is scanned for hooks. Such address space may include any number of different portion(s) of memory. Further, the vulnerable processes may utilize, call, be stored in, etc. the address space.

In one embodiment, the address space may be scanned for the hooks by determining whether the address space has been modified. Optionally, address space may be determined to be modified by comparing the address space to a previous version of the address space. Each modification of the address space may further indicate a hook in the address space. Just by way of example, the hooks may be identified in the manner described above with respect to operation 302 of FIG. 3.

Still yet, the hooks are analyzed for potentially unwanted activity. Note operation 406. Such analysis may be performed in the manner described above with respect to operations 304-308 of FIG. 3, in one embodiment. In another embodiment, the analysis may include determining whether the hook is utilized for hiding at least one of the system objects.

Optionally, the analysis may be performed independently for each of the hooks. In one embodiment, a function and/or pointer modified by each of the hooks may be identified. Accordingly, a hook associated with a highest priority function (e.g. a system objects enumeration function such as a FindFirst, FindNext, etc. function) and/or a highest priority pointer may be analyzed first. Similarly, a hook associated with a lower priority function and/or a lower priority pointer may be analyzed after hooks associated with higher priority functions and/or higher priority pointers. Such priorities may be predefined, for example, by a user, etc.

In another embodiment, if it is determined that a hook is utilized for hiding a system object, the vulnerable process associated with the hook is determined to be associated with potentially unwanted activity. Further, the hook associated with such process may be determined to be unwanted code (e.g. a virus, etc.). As an option, the hook and/or a code section or data section associated therewith may be repaired automatically based on the determination of whether the hook is associated with potentially unwanted activity. Such repair may include removing, deleting, cleaning, etc. the hook.

Figure 5:
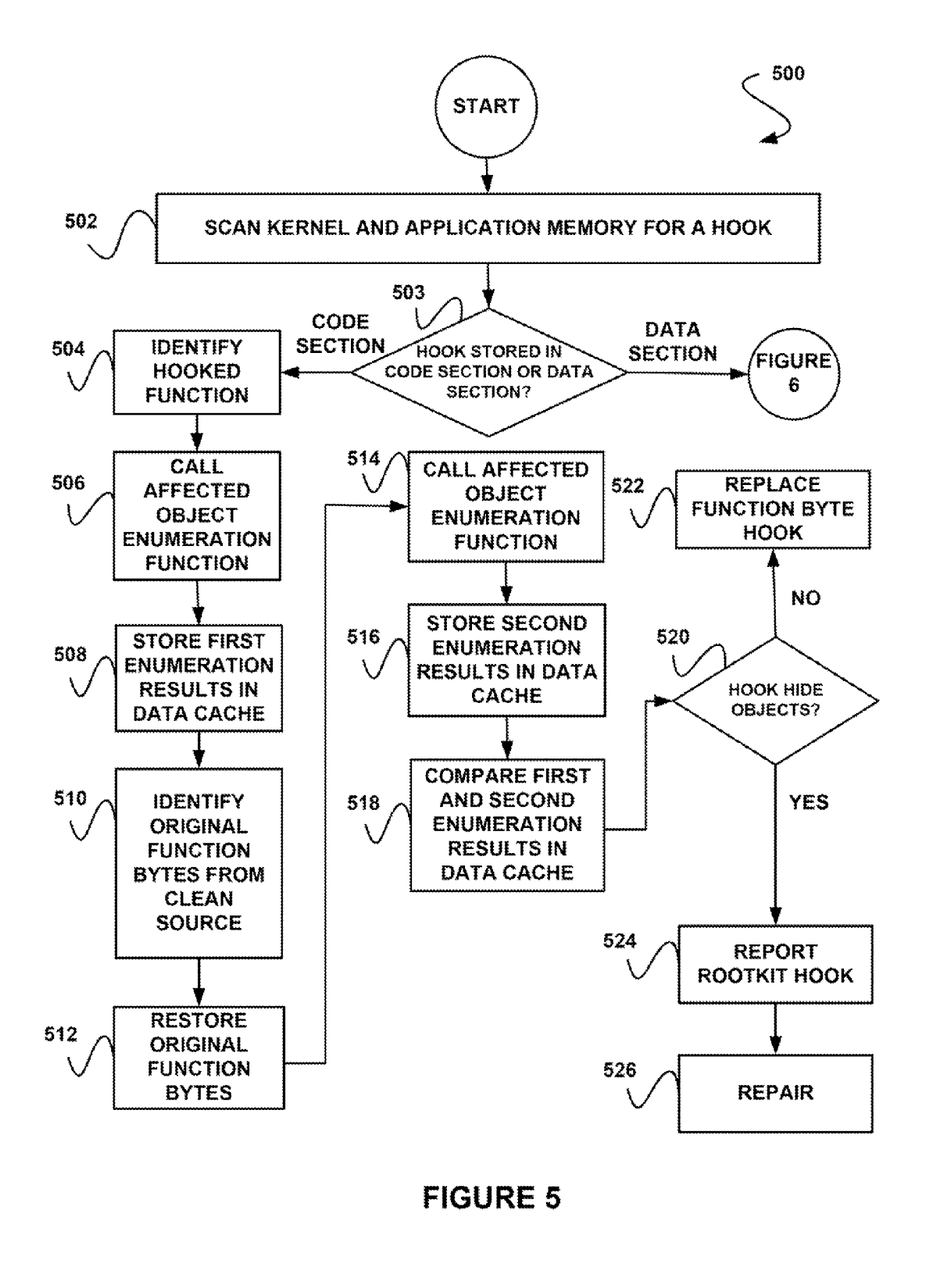
FIG. 5 shows a method for initiating a response based on a determination of whether a hook in a code section is associated with potentially unwanted activity, in accordance with yet another embodiment.

FIG. 5 show a method 500 for initiating a response based on a determination of whether a hook in a code section is associated with potentially unwanted activity, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, a kernel and application memory are scanned for a hook. In one embodiment, the kernel may include a kernel of an operating system. In another embodiment, the application memory may include memory which stores programmed instructions and/or data to control a process. For example, the kernel and the application memory may be scanned for identifying a hook located in such kernel or application memory.

Additionally, it is determined whether the hook is stored in a code section or a data section of memory. Note decision 503. For example, if the hook is identified in the kernel, it may be determined that the hook is stored in the code section. As another example, if the hook is identified in the application memory, it may be determined that the hook is stored in the data section.

If it is determined that the hook is stored in the data section, the method 500 continues to the operations described below in FIG. 6. If, however, it is determined that the hook is stored in the code section, a hooked function is identified (see operation 504). In the context of the present embodiment, the hooked function may include any function associated with the hook. For example, the hooked function may include a function (e.g. JMP, etc.) inserted into the code section utilizing the hook. Optionally, the hooked function may be identified by analyzing the hook.

Further, an affected object enumeration function is called, as shown in operation 506. The affected object enumeration function may include any object enumeration function affected by the hook. For example, the affected object enumeration may include the function associated with the hook. Thus, calling the affected object enumeration may be utilized for identifying objects associated with the hooked function.

Still yet, as shown in operation 508, first enumeration results are stored in data cache. In the context of the present embodiment, the first enumeration results may include results of calling the affected object enumeration function. For example, the results may identify at least one object returned by the affected object enumeration function being called. In addition, the data cache may include any portion of memory capable of storing the results.

Also, original function bytes are identified from a clean source. Note operation 510. The original function bytes may include an original version of the hooked function. For example, the original function bytes may include the hooked function as originally created.

Thus, the original function bytes may not include the hook. Furthermore, the clean source may include any portion of memory in which the original function bytes may be stored without being modified. For example, the clean source may include a protected source capable of preventing any application, code, etc. from modifying the original function bytes.

Such original function bytes are additionally restored, as shown in operation 512. Restoring the original function bytes may include writing the original function bytes to a portion of memory separate from the clean source, in one embodiment. For example, the original function bytes may be restored to a portion of memory via which such original function bytes may be executed. As another example, the original function bytes may be written over the hooked function. Of course, however, the original function bytes may be restored in any manner.

Moreover, the affected object enumeration function is called again, as shown in operation 514. In the context of the present embodiment, the affected object enumeration function may be called with respect to the restored original function bytes. For example, calling the object enumeration function may include calling the original function bytes. In this way, the affected object enumeration function may be called with respect to the function without the hook included therein.

As also shown, second enumeration results are stored in the data cache. Note operation 516. The second enumeration results may include any objects identified by the affected object enumeration function called in operation 514. Accordingly, the results may indicate objects associated with the function when such function does not include the hook. Optionally, the data cache may include the same data cache in which the first enumeration results are stored (in operation 508), but of course may also include a different data cache in which such first enumeration results are stored.

In addition, the first and second enumeration results in the data cache are compared, as shown in operation 518. Comparing the first and second enumeration results may include determining whether the first and second enumeration results match. For example, it may be determined whether the objects included in the first enumeration results match the objects included in the second enumeration results.

Furthermore, it is determined whether the hook hides any objects, as shown in decision 520. In the context of the present embodiment, the determination may be based on the comparison of the first and second enumeration results. In one embodiment, it may be determined that the hook hides objects if the first enumeration results do not match the second enumeration results.

For example, the second enumeration results identified by calling the affected object enumeration function with the hook not included in the function may include additional objects that are not present in the first enumeration results identified by calling the affected object enumeration function with the hook included in the function. Thus, such additional objects identified without the hook in the function may indicate that the hook hides objects. Of course, it should be noted that it may be determined whether the hook hides objects in any desired manner.

If it is determined that the hook does not hide objects, the function byte hook is replaced. Note operation 522. For example, the function bytes that include the hook may replace the restored original function bytes. In this way, a hook that is determined not to hide objects may be maintained in the code section.

However, if it is determined that the hook hides objects, the hook is reported as a rootkit hook. Note operation 524. For example, a user, administrator, etc. may be notified of the rootkit hook. Of course, any user and/or application may be notified of the rootkit hook for analysis purposes, as an option.

Additionally, the code section in which the hook is identified is repaired, as shown in operation 526. The repair may include deleting the hook from the code section, in one embodiment. In another embodiment, the repair may include removing all hooks that reside in the code section associated with the rootkit hook. In yet another embodiment, such repair may be performed in response to a reboot of a system on which the code section is stored.

Figure 6:
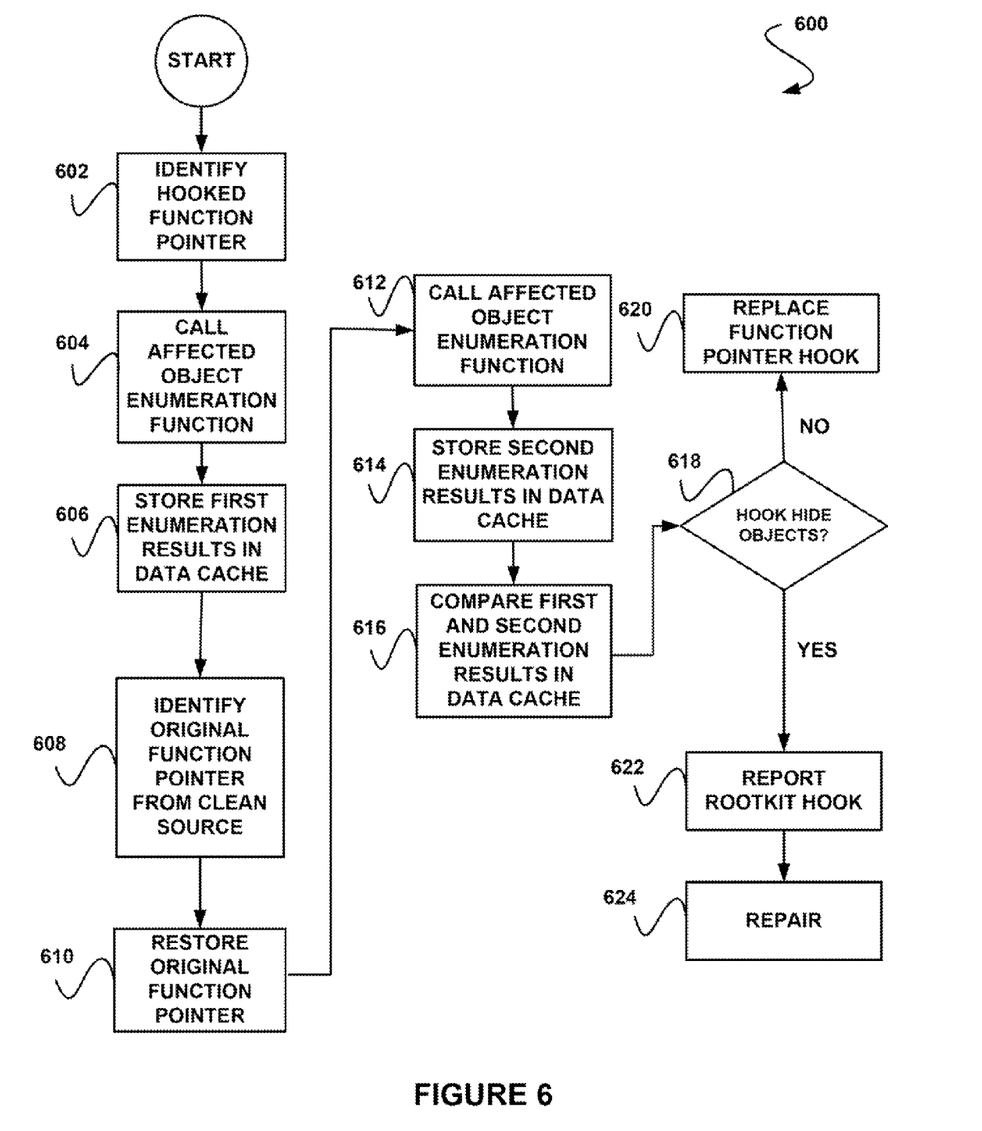
FIG. 6 shows a method for initiating a response based on a determination of whether a hook in a data section is associated with potentially unwanted activity, in accordance with still yet another embodiment.

FIG. 6 shows a method 600 for initiating a response based on a determination of whether a hook in a data section is associated with potentially unwanted activity, in accordance with still yet another embodiment. As an option, the method 600 may be carried out in the context of the architecture and environment of FIGS. 1-5. For example, the method 600 may be carried out in the context of decision 503 of FIG. 5. Of course, however, the method 600 may be carried out in any desired environment. Yet again, it should also be noted that the aforementioned definitions may apply during the present description.

As shown in operation 602, a hooked function pointer is identified. In the context of the present embodiment, the hooked function pointer may include any function pointer associated with a hook. For example, the hooked function pointer may include a function pointer modified in a data section utilizing the hook. Optionally, the hooked function pointer may be identified by analyzing the hook.

In addition, an affected object enumeration function is called, as shown in operation 604. The affected object enumeration function may include any object enumeration function affected by the hook. For example, the affected object enumeration may include a function pointer associated with the hook. Thus, calling the affected object enumeration may be utilized for identifying objects associated with the function pointer.

Still yet, as shown in operation 606, first enumeration results are stored in data cache. In the context of the present embodiment, the first enumeration results may include results of calling the affected object enumeration function. For example, the results may identify at least one object returned by the affected object enumeration function being called. In addition, the data cache may include any portion of memory capable of storing the results.

Also, an original function pointer is identified from a clean source. Note operation 608. The original function pointer may include an original version of the hooked function pointer. For example, the original function pointer may include the hooked function pointer as originally created.

Thus, the original function pointer may not include the hook. Furthermore, the clean source may include any portion of memory in which the original function pointer may be stored without being modified. For example, the clean source may include a protected source capable of preventing any application, code, etc. from modifying the original function pointer.

Such original function pointer is additionally restored, as shown in operation 610. Restoring the original function pointer may include writing the original function pointer to a portion of memory separate from the clean source, in one embodiment. For example, the original function pointer may be restored to a portion of memory via which such original function pointer may be called. As another example, the original function pointer may be written over the hooked function pointer. Of course, however, the original function pointer may be restored in any manner.

Moreover, the affected object enumeration function is called again, as shown in operation 612. In the context of the present embodiment, the affected object enumeration function may be called with respect to the restored original function pointer. In this way, the affected object enumeration function may be called with respect to the function pointer without the associated hook.

As also shown, second enumeration results are stored in the data cache. Note operation 614. The second enumeration results may include any objects identified by the affected object enumeration function called in operation 612. Accordingly, the results may indicate objects associated with the function pointer when such function pointer is not associated with the hook. Optionally, the data cache may include the same data cache in which the first enumeration results are stored (in operation 606), but of course may also include a different data cache in which such first enumeration results are stored.

In addition, the first and second enumeration results in the data cache are compared, as shown in operation 616. Comparing the first and second enumeration results may include determining whether the first and second enumeration results match. For example, it may be determined whether the objects included in the first enumeration results match the objects included in the second enumeration results.

Furthermore, it is determined whether the hook hides any objects, as shown in decision 520. In the context of the present embodiment, the determination may be based on the comparison of the first and second enumeration results. In one embodiment, it may be determined that the hook hides objects if the first enumeration results do not match the second enumeration results.

For example, the second enumeration results identified by calling the affected object enumeration function in which the hook is not associated with the function pointer may include additional objects that are not present in the first enumeration results identified by calling the affected object enumeration function in which the hook is associated with the function pointer. Thus, such additional objects identified without the hook being associated with the function pointer may indicate that the hook hides objects. Of course, it should be noted that it may be determined whether the hook hides objects in any desired manner.

If it is determined that the hook does not hide objects, the function pointer hook is replaced. Note operation 620. For example, the function pointer that is associated with the hook (e.g. the hooked function pointer) may replace the restored original function pointer. In this way, a hook that is determined not to hide objects may be maintained in a data section.

However, if it is determined that the hook hides objects, the hook is reported as a rootkit hook. Note operation 622. For example, a user, administrator, etc. may be notified of the rootkit hook. Of course, any user and/or application may be notified of the rootkit hook for analysis purposes, as an option.

Additionally, the data section in which the hook is identified is repaired, as shown in operation 624. The repair may include deleting the hook from the data section, in one embodiment. In another embodiment, the repair may include removing all hooks that reside in the data section associated with the rootkit hook. In yet another embodiment, such repair may be performed in response to a reboot of a system on which the data section is stored.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a hook in a data section or a code section of a computer, wherein identifying the hook further comprises comparing at least one of the data section to a previous version of the data section, and the code section to a previous version of the code section, and wherein when the hook is in the data section the previous version of the data section is identified by parsing sections in a binary file, and when the hook is in the code section the previous version of the code section is identified in a stored file image of the code section;
performing a first enumeration associated with the data section or the code section to identify an object associated the hook;
overwriting the object associated with the hook with an original version of the object from a clean source to produce a restored object;
performing a second enumeration of the restored object within the data section or the code section;
determining whether the hook is associated with a rootkit by comparing first resulting objects from the first enumeration to second resulting objects from the second enumeration and determining whether the hook functions to hide any of the first resulting objects or the second resulting objects based upon the comparison; and
reporting the hook as a rootkit if it is determined that the hook functions to hide any of the first resulting objects or the second resulting objects.

2. The method of claim 1, wherein the hook includes a memory hook.

3. The method of claim 1, wherein the hook is in the data section, and includes a modification to a function pointer in the data section.

4. The method of claim 1, wherein the hook is in the code section, and includes a modification to a function in the code section.

5. The method of claim 1, wherein the hook is in the data section, and the data section is included in application memory.

6. The method of claim 1, wherein the hook is in the code section, and the code section is included in a kernel of an operating system.

7. The method of claim 1, wherein the hook is identified by scanning at least one of the data section and the code section.

8. The method of claim 1, wherein the hook is in the data section, and the previous version of the data section is identified by locating known function pointers located outside of a main module.

9. The method of claim 1, wherein the first enumeration is affected by the hook.

10. The method of claim 1, wherein the first enumeration is performed with the hook in the data section or the code section.

11. The method of claim 1, wherein the second enumeration is performed with the hook removed from the data section or the code section.

12. The method of claim 1, wherein the rootkit is identified if results of the first enumeration do not match results of the second enumeration.

13. The method of claim 1, further comprising automatically repairing the data section or the code section.

14. A computer program product embodied on a non-transitory computer readable medium for performing operations, comprising:
   identifying a hook in a data section or a code section of a computer, wherein identifying the hook further comprises comparing at least one of the data section to a previous version of the data section, and the code section to a previous version of the code section, and wherein when the hook is in the data section the previous version of the data section is identified by parsing sections in a binary file, and when the hook is in the code section the previous version of the code section is identified in a stored file image of the code section;
   performing a first enumeration associated with the data section or the code section to identify an object associated the hook;
   overwriting the object associated with the hook with an original version of the object from a clean source to produce a restored object;
   performing a second enumeration of the restored object within the data section or the code section;
   determining whether the hook is associated with a rootkit by comparing first resulting objects from the first enumeration to second resulting objects from the second enumeration and determining whether the hook functions to hide any of the first resulting objects or the second resulting objects based upon the comparison; and
   reporting the hook as a rootkit if it is determined that the hook functions to hide any of the first resulting objects or the second resulting objects.

15. A system, comprising: a processor, the system being configured for:
   identifying a hook in a data section or a code section of a computer, wherein identifying the hook further comprises comparing at least one of the data section to a previous version of the data section, and the code section to a previous version of the code section, and wherein when the hook is in the data section the previous version of the data section is identified by parsing sections in a binary file, and when the hook is in the code section the previous version of the code section is identified in a stored file image of the code section;
   performing a first enumeration associated with the data section or the code section to identify an object associated the hook;
   overwriting the object associated with the hook with an original version of the object from a clean source to produce a restored object;
   performing a second enumeration of the restored object within the data section or the code section;
   determining whether the hook is associated with a rootkit by comparing first resulting objects from the first enumeration to second resulting objects from the second enumeration and determining whether the hook functions to hide any of the first resulting objects or the second resulting objects based upon the comparison; and
   reporting the hook as a rootkit if it is determined that the hook functions to hide any of the first resulting objects or the second resulting objects.

16. The system of claim 15, wherein the processor is coupled to memory via a bus.

* * * * *